US008268904B2

(12) United States Patent
Hood et al.

(10) Patent No.: US 8,268,904 B2
(45) Date of Patent: Sep. 18, 2012

(54) EXTRUDED POLYSTYRENE FOAM WITH BROAD COMONOMER CONTENT DISTRIBUTION

(75) Inventors: Lawrence S. Hood, Midland, MI (US); Brian H. Deshano, Sanford, MI (US)

(73) Assignee: Dow Global Technologies LLC, Midland, MI (US)

( * ) Notice: Subject to any disclaimer, the term of this patent is extended or adjusted under 35 U.S.C. 154(b) by 241 days.

(21) Appl. No.: 12/877,166

(22) Filed: Sep. 8, 2010

(65) Prior Publication Data
US 2011/0082223 A1      Apr. 7, 2011

Related U.S. Application Data

(60) Provisional application No. 61/248,898, filed on Oct. 6, 2009.

(51) Int. Cl.
*C08J 9/00* (2006.01)
(52) U.S. Cl. ............ 521/78; 521/81; 521/139; 521/146; 521/147; 264/53; 264/55
(58) Field of Classification Search .................... 521/78, 521/81, 139, 146, 147; 264/53, 55
See application file for complete search history.

(56) References Cited

U.S. PATENT DOCUMENTS

| 3,573,152 A | 3/1971 | Wiley et al. |
| 3,923,922 A | 12/1975 | Grant |
| 4,323,528 A | 4/1982 | Collins |
| 4,824,720 A | 4/1989 | Malone |
| 5,380,767 A | 1/1995 | Suh et al. |
| 2008/0139682 A1 * | 6/2008 | Vo et al. .......................... 521/81 |

FOREIGN PATENT DOCUMENTS

| EP | 0909782 | 4/2000 |
| WO | 2005095501 | 10/2005 |
| WO | 2008030399 | 3/2008 |
| WO | 2008140892 | 11/2008 |
| WO | 2009131795 | 10/2009 |

OTHER PUBLICATIONS

Glockner et al., Characterization of copolymers chromatographic cross-fractionation analysis of styrene-acrylonitrile copolymers., Integration of fundamental polymer science and technology, (1986), Elsevier applied science publishers, vol. 1, p. 85-98.
Maeda et al., Acrylonitrile—styrene copolymer resins—contain specified acrylonitrile content and have specified narrow copolymer comps. distribution, fine colour tone, good transparency, rigidity, etc., WPI/Thomson, 1993, No. 12.—Abstract provided by WIPO.
Striegel, Andre M., Determining and correcting "moment bias" in gradient polymer elution chromatography., Journal of Chromatography A, 996 (2003) 45-51.

* cited by examiner

*Primary Examiner* — Irina S Zemel
(74) *Attorney, Agent, or Firm* — Steven W. Mork

(57) ABSTRACT

Prepare an extruded polymeric foam using a thermoplastic polymer composition of styrene-acrylonitrile copolymer having a copolymerized acrylonitrile comonomer content of 20 weight-percent or less, a mean acrylonitrile comonomer content that exceeds its median acrylonitrile comonomer content and an average copolymerized acrylonitrile comonomer distribution having a breadth at half-height that is greater than 2.5 weight-percent as measured at half peak height of a copolymerized acrylonitrile comonomer distribution curve for the styrene-acrylonitrile copolymer.

12 Claims, No Drawings

EXTRUDED POLYSTYRENE FOAM WITH BROAD COMONOMER CONTENT DISTRIBUTION

CROSS REFERENCE STATEMENT

This application claims the benefit of U.S. Provisional Application No. 61/248,898, filed Oct. 6, 2009, the entire content of which is incorporated herein by reference.

BACKGROUND OF THE INVENTION

1. Field of the Invention

The present invention relates to an extruded polymeric foam article and a process for preparing the extruded polymeric foam article.

2. Description of Related Art

Preparing extruded polymer foam that has desirable skin quality is challenging when using water as a blowing agent. Water tends to cause undesirable pinholes (also known as blowholes) that can disrupt a foam surface. Prior art references offer some ways to reduce undesirable effects of an aqueous blowing agent in preparing extruded foam.

PCT publication WO/2008/140892 discloses that use of a styrene-acrylonitrile (SAN) copolymer having a polydispersity index less than 2.5 in combination with a blowing agent comprising water and a fluorinated compound can produce polymer foam having a good skin quality that is free from blowholes. This reference does not characterize good skin quality in regards to smoothness, just in terms of visible defects. Even a foam surface that is free of visible defects can have a surface roughness detectable to the touch in the form of, for example, orange peel texturing.

U.S. Pat. No. 5,380,767 discloses that increasing the water solubility of a styrenic polymer composition or including an additive into the styrenic polymer composition that enhances the water solubility of the styrenic polymer composition can produce a closed-cell, monomodal foam from the styrenic polymer even with an aqueous blowing agent. This reference does not discuss quality of the resulting foam surface, particularly the smoothness of the foam surface.

International application number PCT/US09/038718 discloses use of SAN copolymer having a zero or positive skew in copolymerized acrylonitrile (AN) composition distribution that can produce extruded polymer foam having high quality surface skin, even with an aqueous blowing agent. This reference does not characterize good skin quality in regards to smoothness, just in terms of visible defects. Even a foam surface that is free of defects can have a surface roughness detectable to the touch.

It is desirable to further advance the art of preparing extruded thermoplastic polymer foam having a high quality surface skin, particularly a smooth skin, while using an aqueous blowing agent over these known methods.

BRIEF SUMMARY OF THE INVENTION

The present invention advances the art of extruded polystyrene (XPS) foam by discovering a novel and inventive method for achieving XPS foam having high quality and smooth surface skin even with an aqueous blowing agent. The invention solves a problem of achieving not only defect-free surface but achieving surface skin that is smooth to the touch even when using an aqueous blowing agent.

Surprisingly, SAN copolymer foam having a smooth defect-free surface skin can be made with an aqueous blowing agent by using an SAN characterized by an average copolymerized acrylonitrile comonomer (AN) distribution having a breadth at half-height that is greater than 2.5 weight-percent (wt %) as measured at half peak height of a copolymerized acrylonitrile comonomer distribution curve for the styrene-acrylonitrile copolymer In a first aspect, the present invention is an extruded polymeric foam article comprising a polymer matrix with a continuous thermoplastic polymer phase, the polymer matrix defining a multitude of cells therein and the continuous thermoplastic polymer phase having a continuous phase of styrene-acrylonitrile polymer characterized by having: (a) an acrylonitrile content of 20 weight-percent or less and five weight-percent or more, with weight-percent based on total styrene-acrylonitrile copolymer weight; (b) a mean acrylonitrile comonomer content that exceeds its median acrylonitrile comonomer content; and (c) an average copolymerized acrylonitrile comonomer distribution having a breadth at half-height that is greater than 2.5 weight-percent as measured at half peak height of a copolymerized acrylonitrile comonomer distribution curve for the styrene-acrylonitrile copolymer.

In a second aspect, the present invention is a process for preparing the extruded polymeric foam article of the first aspect, the process comprising: (a) providing a foamable thermoplastic polymer composition comprising an aqueous blowing agent and a continuous phase of styrene-acrylonitrile polymer at an initial temperature and pressure that causes the foamable thermoplastic polymer composition to be in a softened state; and (b) extruding the foamable thermoplastic polymer composition through a foaming die into an atmosphere at a pressure and temperature lower than the initial temperature and pressure and allowing the foamable polymer composition to expand into an extruded polymer foam article; wherein the process is further characterized by the styrene-acrylonitrile copolymer having a copolymerized acrylonitrile comonomer content of 20 weight-percent or less and five weight-percent or more, with weight-percent based on total styrene-acrylonitrile copolymer weight, a mean acrylonitrile comonomer content that exceeds its median copolymerized acrylonitrile comonomer content and an average copolymerized acrylonitrile comonomer distribution having a breadth at half-height that is greater than 2.5 weight-percent as measured at half peak height of a copolymerized acrylonitrile comonomer distribution curve for the styrene-acrylonitrile copolymer.

The process of the present invention is useful for the fabrication of the XPS foam of the present invention. The XPS foam of the present invention is useful as, for example, thermal insulating material.

DETAILED DESCRIPTION OF THE INVENTION

Test methods refer to the most recent test method as of the priority date of this document when a date is not indicated with the test method number. References to test methods contain both a reference to the testing society and the test method number. The following test method abbreviations and identifies apply herein: ASTM refers to American Society for Testing and Materials; EN refers to European Norm; DIN refers to Deutches Institute fur Normung; and ISO refers to International Organization for Standards.

"Multiple" means two or more. "And/or" means "and, or as an alternative". All ranges include endpoints unless otherwise indicated.

Polymeric foam articles have a primary surface that is a surface of the article that has a planar surface area equal the greatest planar surface area of all surfaces of the article.

Planar surface area is the area of a surface as projected onto a plane in order to avoid consideration for surface textures in the article.

The article of the present invention is an extruded polymeric foam article. Extruded polymeric foam articles are characteristically unique from other types of polymeric foam articles such as expanded polymeric foam articles both in their method of manufacture and article characteristics. Generally, extruded foam is a continuous, seamless structure of interconnected cells resulting from a single foamable composition expanding into a single extruded foam structure. However, one embodiment of extruded foam includes "strand foam". Strand foam comprises multiple extruded strands of foam defined by continuous polymer skins with the skins of adjoining foams adhered to one another. Polymer skins in strand foams extend only in the extrusion direction of the strand and do not enclose groups of cells because the ends of the strands are not covered by skins. In contrast, expanded bead foam has a characteristic continuous network of polymer bead skins that encapsulate collections of foam cells within the foam. Polymer bead skins have a higher density than cell walls within the bead skins. The polymer bead skins extend in multiple directions and connect any foam surface to an opposing foam surface, and generally interconnect all foam surfaces. The polymer bead skins are residual skins from each foam bead that expanded to form the foam. The bead skins coalesce together to form a foam structure comprising multiple expanded foam beads. Bead foams tend to be more friable than extruded foam because they can fracture along the bead skin network. Moreover, the bead skin network provides a continuous thermal short from any one side of the foam to an opposing side, which is undesirable in a thermal insulating material.

The extruded polymeric foam article of the present invention comprises a polymer matrix that defines a multitude of cells therein. Polymeric foam articles have a continuous polymer matrix with cells distributed within the polymer matrix and defined by the polymer matrix. The articles of the present invention are polymeric foam articles with a continuous polymer matrix that comprises a continuous thermoplastic polymer phase. Therefore, the thermoplastic polymer phase defines the cells as part of the polymer matrix. Thermoset polymers may exist within the polymer matrix, provided the matrix has a continuous thermoplastic polymer phase. Desirably, greater than 50 weight-percent (wt %), preferably 75 wt % or more, more preferably 80 wt % or more, still more preferably 85 wt % or more and can be 90 wt % or more, 95 wt % or more and even 100 wt % of the polymer matrix can be thermoplastic polymer based on polymer matrix weight.

The continuous thermoplastic polymer phase comprises continuous styrene-acrylonitrile (SAN) copolymer. The continuous thermoplastic polymer phase can comprise thermoplastic polymers in addition to SAN copolymer, but preferably the continuous thermoplastic polymer phase, and polymer matrix itself, is greater than 50 weight-percent (wt %), preferably 75 wt % or more, more preferably 80 wt % or more, still more preferably 85 wt % or more and can be 90 wt % or more, 95 wt % or more and even 100 wt % SAN copolymer based on thermoplastic polymer phase weight, polymer matrix weight, or both thermoplastic polymer phase weight and polymer matrix weight.

The SAN copolymer consists of one or more than one type of SAN copolymer. SAN copolymer in the SAN copolymer composition can be block copolymer, a random copolymer, linear, branched or any combination of such types of SAN copolymers. Polymerized AN components typically make up 20 wt % or less, more typically 15 wt % or less based on the total weight of SAN copolymer. Moreover, polymerized AN components desirably make up five wt % or more, preferably ten wt % or more based on the total weight of SAN copolymer. If the concentration of copolymerized AN is below five wt % the SAN copolymer risks having an undesirably low water solubility, which hinders use of aqueous blowing agents.

Moreover, the SAN copolymer has a mean copolymerized acrylonitrile comonomer content that exceeds its median copolymerized acrylonitrile comonomer content. At the same time, the SAN copolymer has an average copolymerized acrylonitrile comonomer distribution having a breadth at half-height that is greater than 2.5 wt % as measured at half peak height of a copolymerized acrylonitrile comonomer distribution curve for the styrene-acrylonitrile copolymer. The copolymerized acrylonitrile comonomer content distribution curve is evident in a plot having copolymerized comonomer concentration in wt % on the x-axis and frequency of occurrence on the y-axis. Determine the breadth of copolymerized acrylonitrile comonomer distribution by identifying the peak in the comonomer content distribution curve that corresponds to the highest occurrence of acrylonitrile comonomer. Identify the percent of comonomer on either side of this peak that has a comonomer occurrence equal to half of that at the peak (that is, at half peak height). The absolute value of the difference between these two percentages is the breadth of copolymerized acrylonitrile comonomer distribution as determined at half peak of the copolymerized acrylonitrile comonomer distribution curve. If a SAN copolymer comprises a blend of two or more SAN copolymers having different copolymerized acrylonitrile comonomer distribution curves, determine the breadth of copolymerized acrylonitrile comonomer distribution as determined at half peak of the copolymerized acrylonitrile comonomer distribution curve for each SAN copolymer in the blend and average them together using a weighted average based on the wt % of each copolymer to determine the average value. If the SAN copolymer only contains an SAN copolymer having a single copolymerized acrylonitrile comonomer distribution curve then the breadth value for that SAN copolymer serves as the "average" value for the SAN copolymer.

The polymer matrix can be free of certain polymers including styrene-butadiene copolymers, particularly those having a weight-averaged molecular weight of 100,000 to 140,000 grams per mole.

Surprisingly, extruding a thermoplastic polymer having the composition of the polymer matrix as just described is capable of forming a thermoplastic polymeric foam article having a surface skin that is smooth to the touch while using an aqueous blowing agent, but without requiring an SAN copolymer with polydispersity index greater than 2.5, use of a water soluble additive, or use of an SAN copolymer having a zero or positive skew in its copolymerized acrylonitrile comonomer composition distribution. The thermoplastic polymer and/or polymer matrix of the present extruded polymeric foam article can be free of any one, any combination of more than one and even be free of all of the following: SAN copolymer having a polydispersity index of less than 2.5, additives to increase water solubility in the polymer matrix, and SAN copolymer having a zero or positive skew in copolymerized AN composition distribution.

The extruded thermoplastic polymer foam article can further comprise one or any combination or more than one type of additive. Examples of types of additives include: infrared attenuating agents (for example, carbon black, graphite, metal flake, titanium dioxide); clays such as natural absorbent clays (for example, kaolinite and montmorillonite) and synthetic clays; nucleating agents (for example, talc and magnesium silicate); flame retardants (for example, brominated flame retardants such as hexabromocyclododecane and brominated polymers and copolymers, phosphorous flame retardants such as triphenylphosphate, and flame retardant packages that may including synergists such as, for example, dicumyl and polycumyl); lubricants (for example, calcium stearate and barium stearate); and acid scavengers (for example, magnesium oxide and tetrasodium pyrophosphate). It is particularly desirable for the extruded thermoplastic polymer foam article to comprise infrared attenuating agents to minimize thermal conductivity through the article. Additives are typically dispersed within the polymer matrix, generally within the continuous thermoplastic polymer phase, and are present at a concentration of up to 15 wt % based on total polymer weight in the polymeric foam article.

The extruded thermoplastic polymeric foam article of the present invention desirably has a density of 64 kilograms per cubic meter ($kg/m^3$) or less, preferably 55 $kg/m^3$ or less, more preferably 50 $kg/m^3$ or less, still more preferably 48 $kg/m^3$ or less, even more preferably 36 $kg/m^3$ or less and can have a density of 33 $kg/m^3$ or less and even 30 $kg/m^3$ or less. Generally, the density is 18 $kg/m^3$ or more in order to ensure mechanical integrity of during handling. Determine foam density according to ASTM method D-1622-03.

The polymeric foam can be open celled or close celled, but is preferably close celled. An open celled foam has an open cell content of 30% or more. A closed cell foam has an open cell content of less than 30%. Desirably, the foam of the present invention has an open cell content of 20% or less, preferably 10% or less, more preferably 5% or less, still more preferably 1% or less and can have an open cell content of 0%. Determine open cell content according to ASTM method 6226-05.

The cells of the polymeric foam desirably have an average cell size, or average vertical cell size, of 0.05 millimeters, preferably 0.10 millimeters or more and more preferably 0.15 millimeters or more. At the same time, the cells of the polymeric foam article desirably have an average cell size (vertical cell size) of one millimeter or less, preferably 0.5 millimeters or less, more preferably 0.35 millimeters or less. Determine average cell size according to ASTM method D-3576-04. The polymeric foam can have a multimodal (including bimodal) or monomodal cell size distribution. Vertical cell size refers to the dimension of the cell in a vertical direction. The vertical direction corresponds to a foam's thickness dimension, which is perpendicular to a primary surface of the foam.

The process of the present invention is an extrusion foam process suitable for preparing the thermoplastic polymeric foam article of the present invention. The extrusion process can be continuous or semi-continuous (for example, accumulative extrusion). In a general extrusion process, prepare a foamable thermoplastic polymer composition of a thermoplastic polymer composition with a blowing agent in an extruder by heating a thermoplastic polymer composition to soften it, mixing a blowing agent composition together with the softened thermoplastic polymer composition at an initial (mixing) temperature and an initial pressure that precludes expansion of the blowing agent to any meaningful extent (preferably, that precludes any blowing agent expansion) and then expelling the foamable composition through a die into an environment having a temperature and pressure below the initial temperature and initial pressure. Upon expelling the foamable composition into the lower pressure the blowing agent expands the thermoplastic polymer into a thermoplastic polymer foam. Desirably, cool the foamable composition after mixing and prior to expelling it through the die. In a continuous process, it is desirable to expel the foamable composition at an essentially constant rate into the lower pressure to enable essentially continuous foaming.

Accumulative extrusion is a semi-continuous process that comprises: 1) mixing a thermoplastic material and a blowing agent composition to form a foamable polymer composition; 2) extruding the foamable polymer composition into a holding zone maintained at a temperature and pressure which does not allow the foamable polymer composition to foam; the holding zone having a die defining an orifice opening into a zone of lower pressure at which the foamable polymer composition foams and an openable gate closing the die orifice; 3) periodically opening the gate while substantially concurrently applying mechanical pressure by means of a movable ram on the foamable polymer composition to eject it from the holding zone through the die orifice into the zone of lower pressure, and 4) allowing the ejected foamable polymer composition to expand to form the foam. U.S. Pat. No. 4,323,528, herein incorporated by reference, discloses such a process in a context of making polyolefin foams, yet which is readily adaptable to aromatic polymer foam.

Coalesced foam processes are also suitable embodiments of the present extrusion process. U.S. Pat. Nos. 3,573,152 and 4,824,720 (the teachings of both are incorporated herein by reference) contain descriptions of coalesced foam processes. In general, during a coalesced foam process a foamable polymer composition extrudes through a die containing multiple orifices oriented such that when the foamable polymer composition expands upon extrusion the resulting strands of foaming polymer contact one another and partially coalesce together. The resulting foam ("strand foam") is a composition of foam strands extending in the extrusion direction of the foam. A skin typically defines each strand in the coalesced foam. While coalesced foam processes are suitable, the process can be free of forming independent foam strands and then subsequently fusing the strands together to foam a stand foam.

In the process of the present invention, provide a foamable thermoplastic polymer composition comprising an aqueous blowing agent and a continuous phase of SAN copolymer at an initial temperature and pressure that causes the foamable thermoplastic polymer composition to be in a softened state—softened enough undergo extrusion without destroying the polymer. The foamable thermoplastic polymer composition comprises a thermoplastic polymer composition that is as described for the polymer matrix of the foam article of the present invention (the foamable thermoplastic polymer composition essentially becomes the thermoplastic polymer matrix of the resulting foam). As described earlier, the SAN copolymer has a copolymerized acrylonitrile comonomer content of 20 wt % or less based on total SAN copolymer weight, a mean copolymerized acrylonitrile comonomer content that exceeds it median copolymerized acrylonitrile comonomer content, and that has an breadth of copolymerized acrylonitrile comonomer distribution greater than 2.5 wt % as measured at half peak height of an acrylonitrile content distribution curve.

The foamable thermoplastic polymer composition, as with the polymer matrix described earlier, can comprise additives as described earlier.

The foamable thermoplastic polymer composition further comprises an aqueous blowing agent, which means the blowing agent comprises water. Desirably, water is present at a concentration of 0.5 wt % or more, preferably 0.9 wt % or more to maximize the use of economically friendly blowing agent. At the same time, water is typically present at a concentration of 1.7 wt % or less, more typically 1.2 wt % or less. The water concentrations are relative to total polymer in the foamable thermoplastic polymer composition.

In addition to water, the blowing agent can comprise any one or any combination of more than one additional blowing agent. Suitable additional blowing agents include: inorganic gases such as carbon dioxide, argon, nitrogen, and air; organic blowing agents such as aliphatic and cyclic hydrocarbons having from one to nine carbons including methane, ethane, propane, n-butane, isobutane, n-pentane, isopentane, neopentane, cyclobutane, and cyclopentane; fully and partially halogenated alkanes and alkenes having from one to five carbons, preferably that are chlorine-free (e.g., difluoromethane (HFC-32), perfluoromethane, ethyl fluoride (HFC-161), 1,1-difluoroethane (HFC-152a), 1,1,1-trifluoroethane (HFC-143a), 1,1,2,2-tetrafluoroethane (HFC-134), 1,1,1,2 tetrafluoroethane (HFC-134a), pentafluoroethane (HFC-125), perfluoroethane, 2,2-difluoropropane (HFC-272fb), 1,1,1-trifluoropropane (HFC-263fb), 1,1,1,2,3,3,3-heptafluoropropane (HFC-227ea), 1,1,1,3,3-pentafluoropropane (HFC-245fa), and 1,1,1,3,3-pentafluorobutane (HFC-365mfc)); fully and partially halogenated polymers and copolymers, desirably fluorinated polymers and copolymers, even more preferably chlorine-free fluorinated polymers and copolymers; aliphatic alcohols having from one to five carbons such as methanol, ethanol, n-propanol, and isopropanol; carbonyl containing compounds such as acetone, 2-butanone, and acetaldehyde; ether containing compounds such as dimethyl ether, diethyl ether, methyl ethyl ether; carboxylate compounds such as methyl formate, methyl acetate, ethyl acetate; carboxylic acid and chemical blowing agents such as azodicarbonamide, azodiisobutyronitrile, benzenesulfo-hydrazide, 4,4-oxybenzene sulfonyl semi-carbazide, p-toluene sulfonyl semi-carbazide, barium azodicarboxylate, N,N'-dimethyl-N,N'-dinitrosoterephthalamide, trihydrazino triazine and sodium bicarbonate.

One desirable embodiment uses a blowing agent comprising, and can consist of water and carbon dioxide.

Extrude the softened foamable thermoplastic polymer composition through a foaming die into an atmosphere at a pressure and temperature lower than the initial temperature and pressure. The extrusion die has a die lip temperature that is desirably 60 degrees Celsius (° C.) or higher, preferably 65° C. or higher, still more preferably 70° C. or a higher. At the same time the die lip temperature is desirably 90° C. or lower. Allow the extruded foamable thermoplastic polymer composition to expand into a polymeric foam article having a smooth surface skin and having the characteristics as described for the article of the present invention.

Affirmative cooling may be applied to the foaming or foamed thermoplastic polymer composition or cooling may occur by merely being extruded into an environment of lower temperature than in the extruder.

The resulting extruded thermoplastic polymeric foam article is an article of the present invention.

EXAMPLES

The following examples illustrate embodiments of the present invention.

The following four resins are used to prepare samples and can be prepared using either continuous stirred tank reactor (CSTR) or three stirred-tube reactors (STR) in series:

| Resin | Mw | Mn | Polydispersity Index (Mw/Mn) | Method of Preparation | Mean AN wt % | Median AN wt % | wt % AN width of Peak at ½ Height |
|---|---|---|---|---|---|---|---|
| 1 | 122.7 | 54.1 | 2.27 | CSTR | 15.34 | 15.54 | 2.1 |
| 2 | 150.1 | 66.6 | 2.25 | CSTR | 15.62 | 15.80 | 1.8 |
| 3 | 118.1 | 49.7 | 2.38 | STR | 14.90 | 14.86 | 3.9 |
| 4 | 147.4 | 59.6 | 2.47 | STR | 15.16 | 15.01 | 3.62 |

Comparative Examples A(i)-(iii) use a thermoplastic polymer composition that is a 50/50 blend by weight of Resins 1 and 2. The average % AN at ½ peak height for the Comparative Examples is 2.0. The Median AN wt % also exceeds the Mean AN wt % in this polymer composition.

Examples 1 (i)-(iii) use a thermoplastic polymer composition that is a 50/50 blend by weight of Resins 3 and 4. The average AN wt % at ½ peak height for the Examples 1(a)-(e) is 3.74. The Mean AN wt % exceeds the Median AN wt % for this polymer composition.

Feed the appropriate thermoplastic polymer composition at a rate of 91 kilograms (200 pounds) per hour into an extruder at an initial (mixing) temperature of approximately 200 degrees Celsius (° C.). Add the following additives: 0.2 wt % barium stearate, 0.3 wt % linear low density polyethylene (DOWLEX® 2247g brand polyethylene, DOWLEX is a trademark of The Dow Chemical Company), 0.15 wt % talc, 0.74 wt % Saytex® HP-900 hexabromocyclododecane (Saytex is a trademark of Albemarle Corp.), 0.11 wt % ECN1280 ortho-cresol novolac epoxy resin and 0.11 wt % Irganox®B215 thermal stabilizer (Irganox is a trademark of CIBA Specialty Chemicals Corp.), where wt % is based on total thermoplastic polymer composition weight.

Form a foamable polymer composition by adding a blowing agent composition consisting of 7.5 wt % 1,1,1,2-tetrafluoroethane (HFC-134a), 1.2 wt % carbon dioxide and 0.9 wt % water. As before, wt % is relative total thermoplastic polymer composition weight.

Cool the foamable polymer composition to a temperature of 132° C. Extrude the foamable polymer composition through a slit die having a slit width of 13.3 centimeters (5.25 inches) into atmospheric pressure (approximately 760 millimeter mercury) and allow to expand into a thermoplastic polymeric foam article having cross sectional dimension as reported in Table 1 (below). Using different die lip temperatures for samples (1)-(111) as follows: (i) has a die lip temperature of 70° C.; (ii) 80° C., and (iii) 90° C.

Characterize the surface skin quality for the primary surface and a surface opposing the primary surface for each sample and then average the quality value for each of those surfaces to get an average surface skin quality value.

Characteristics and properties of the resulting thermoplastic polymeric foam articles are listed in Table 1:

TABLE 1

| Property | Example | | | | | |
|---|---|---|---|---|---|---|
| | A(i) | A(ii) | A(iii) | 1(i) | 1(ii) | 1(iii) |
| Average Surface Skin Quality[a] | 7 | 6 | 5 | 8 | 8 | 8 |
| Density (kg/m$^3$) | 31.4 | 31.4 | 31.7 | 31.9 | 31.9 | 32.0 |
| Cross sectional area (cm$^2$) | 56.1 | 51.6 | 49.7 | 56.1 | 54.2 | 54.2 |
| Average vertical Cell Size (mm) | 0.20 | 0.18 | 0.18 | 0.19 | 0.18 | 0.17 |
| Open Cell content (%) | 1.2 | 1.8 | 1.6 | 2.9 | 2.1 | 2.0 |

[a]Evaluate skin quality using the following scale: 5 = surface roughness discernable to the touch; 7 = surface smooth to the touch but streaking visibly apparent; 9 = surface smooth to the touch and visibly uniform.

The data in Table 1 reveals a surprising result that, all else being equal, thermoplastic polymeric foam articles prepared using an SAN having an average copolymerized acrylonitrile comonomer distribution having a breadth at half-height that is greater than 2.5 wt % as measured at half peak height of a copolymerized acrylonitrile comonomer distribution curve for the styrene-acrylonitrile copolymer and a Mean AN wt % that exceeds the Median AN wt % produces a higher quality skin surface than thermoplastic polymeric foam articles prepared using an SAN having an average copolymerized acrylonitrile comonomer content breadth of less than 2.5 wt % as measured at half peak height and median AN wt % that exceeds the Mean AN wt % when prepared using a die lip temperature in a range from 70° C. to 90° C.

The invention claimed is:

1. An extruded polymeric foam article comprising a polymer matrix with a continuous thermoplastic polymer phase, the polymer matrix defining a multitude of cells therein and the continuous thermoplastic polymer phase having a continuous phase of styrene-acrylonitrile polymer characterized by having:
   a. an acrylonitrile content of 20 weight-percent or less and five weight-percent or more, with weight-percent based on total styrene-acrylonitrile copolymer weight;
   b. a mean acrylonitrile comonomer content that exceeds its median acrylonitrile comonomer content; and
   c. an average copolymerized acrylonitrile comonomer distribution having a breadth at half-height that is greater than 2.5 weight-percent as measured at half peak height of a copolymerized acrylonitrile comonomer distribution curve for the styrene-acrylonitrile copolymer.

2. The extruded polymeric foam article of claim 1, further characterized by having a surface skin quality that is smooth to the touch.

3. The extruded polymeric foam article of claim 1, further characterized by being free of SAN copolymer having a positive skew in its copolymerized acrylonitrile concentration distribution and by the styrene-acrylonitrile copolymer having a polydispersity index that is greater than 2.5.

4. The extruded polymeric foam article of claim 1, further comprising infrared attenuator dispersed within the continuous thermoplastic polymer phase.

5. The extruded polymeric foam article of claim 1, further characterized by having a density of 32 kilograms per cubic meter or less and an open cell content of 30% or less.

6. A process for preparing the extruded polymeric foam article of claim 1, the process comprising:
   a. providing a foamable thermoplastic polymer composition comprising an aqueous blowing agent and a continuous phase of styrene-acrylonitrile polymer at an initial temperature and pressure that causes the foamable thermoplastic polymer composition to be in a softened state; and
   b. extruding the foamable thermoplastic polymer composition through a foaming die into an atmosphere at a pressure and temperature lower than the initial temperature and pressure and allowing the foamable polymer composition to expand into an extruded polymer foam article
   wherein the process is further characterized by the styrene-acrylonitrile copolymer having a copolymerized acrylonitrile comonomer content of 20 weight-percent or less and five weight-percent or more, with weight-percent based on total styrene-acrylonitrile copolymer weight, a mean acrylonitrile comonomer content that exceeds its median copolymerized acrylonitrile comonomer content and an average copolymerized acrylonitrile comonomer distribution having a breadth at half-height that is greater than 2.5 weight-percent as measured at half peak height of a copolymerized acrylonitrile comonomer distribution curve for the styrene-acrylonitrile copolymer.

7. The process of claim 6, further characterized by the foamable polymer composition expanding to a polymeric foam article that is smooth to the touch.

8. The process of claim 6, further characterized by the foaming die having a die lip temperature in a range of 60 degrees Celsius to 90 degrees Celsius.

9. The process of claim 6, further characterized by being free of styrene-acrylonitrile copolymer having a zero or positive skew in its copolymerized acrylonitrile concentration distribution and styrene-acrylonitrile copolymer having a polydispersity index that is less than 2.5.

10. The process of claim 6, further characterized by the foamable thermoplastic polymer composition having infrared attenuator dispersed therein.

11. The process of claim 6, further characterized by the aqueous blowing agent comprising at least five weight-percent water based on total blowing agent weight.

12. The process of claim 11, further characterized by the aqueous blowing agent comprising water and carbon dioxide.

* * * * *